US006947878B2

(12) United States Patent
Bisgaard-B hr et al.

(10) Patent No.: US 6,947,878 B2
(45) Date of Patent: Sep. 20, 2005

(54) ANALYSIS OF RETAIL TRANSACTIONS USING GAUSSIAN MIXTURE MODELS IN A DATA MINING SYSTEM

(75) Inventors: Mikael Bisgaard-B hr, Hellerup (DK); Scott Woodroofe Cunningham, Mountain View, CA (US)

(73) Assignee: NCR Corporation, Dayton, OH (US)

( * ) Notice: Subject to any disclaimer, the term of this patent is extended or adjusted under 35 U.S.C. 154(b) by 974 days.

(21) Appl. No.: 09/739,991

(22) Filed: Dec. 18, 2000

(65) Prior Publication Data

US 2002/0077790 A1 Jun. 20, 2002

(51) Int. Cl.[7] .............................................. G06F 17/10
(52) U.S. Cl. ................................................ 703/2; 707/6
(58) Field of Search ............................ 703/2; 707/6, 3; 704/236

(56) References Cited

U.S. PATENT DOCUMENTS

| 5,787,425 | A | | 7/1998 | Bigus | |
|---|---|---|---|---|---|
| 5,909,681 | A | | 6/1999 | Passera et al. | |
| 6,263,337 | B1 | * | 7/2001 | Fayyad et al. | 707/6 |
| 6,581,058 | B1 | * | 6/2003 | Fayyad et al. | 707/6 |
| 6,591,235 | B1 | * | 7/2003 | Chen et al. | 704/236 |
| 6,816,848 | B1 | * | 11/2004 | Hildreth et al. | 706/45 |

OTHER PUBLICATIONS

C. Aggrawal et al., "Fast Algorithms for Projected Clustering," In Proceedings of the ACM SIGMOD Int'l Conf on Management of Data, Philadelphia, PA, 1999.
R. Agrawal et al., "Automatic Subspace Clustering of High . . . Applications," In Proceedings of ACM SIGMOD Int'l Conf on Management of Data, Seattle, WA, 1998.

H. Bozdogan, "Model selection and Akaike's information criterion . . . extensions," Psychometrika, 52(3):345–370, 1987.
P.S. Bradley et al., "Scaling Clustering Algorithms to Large Databases," In Proceedings of the Int'l Knowledge Discovery and Data Mining Conference (KDD), 1998.
P.S. Bradley eet al., "Scaling EM (Expectation–Maximization) Clustering to Large Databases," Microsoft Research Technical Report, 20 pages, 1998.
A.P. Dempster et al., "Maximum Likelihood from Incomplete Data via the EM Algorithm," Journal of The Royal Statistical Society, 39(1):1–38, 1977.
M. Ester et al., "A Density–Based Algorithm for Discovering . . . Noise," In Proceedings of the IEEE, Int'l Conf on Data Engineering (ICDE), Portland, Oregon, 1996.
G. Graefe et al., "On the Efficient Gathering . . . Databases," Microsoft, AAAI, 5 pages, 1998.
A. Hinneburg et al., "Optimal Grid–Clustering. Towards Breaking the Curse . . . Clustering," In Proceedings of the 25th Int'l Conf on Very Large Data Bases, Edinburgh, Scotland, 1999.

(Continued)

*Primary Examiner*—Albert W. Paladini
(74) *Attorney, Agent, or Firm*—Gates & Cooper LLP; James M. Stover

(57) ABSTRACT

A computer-implemented data mining system that analyzes data using Gaussian Mixture Models. The data is accessed from a database, and then an Expectation-Maximization (EM) algorithm is performed in the computer-implemented data mining system to create the Gaussian Mixture Model for the accessed data. The EM algorithm generates an output that describes clustering in the data by computing a mixture of probability distributions fitted to the accessed data.

12 Claims, 3 Drawing Sheets

OTHER PUBLICATIONS

M.I. Jordan et al., "Hierarchical Mixtures of Experts and the EM Algorithm," Neural Computation, 6:181–214, 1994.

F. Murtagh, "A Survey of Recent Advances in Hierarchical Clustering Algorithms," The Computer, Journal, 26(4):354–359, 1983.

R.T. Ng et al., "Efficient and Effective Clustering Methods . . . Mining," In Proc. of the VLDB Conf, Santago, Chile, 1994.

W.H. Press et al., "Numerical Recipes in C," Cambridge University Press: Cambridge, 20 pgs., 1986.

S. Roweis, "A Unifying Review of Linear Gaussian Models," Neural Computation, 11:305–345, 1999.

T. Zhang et al., "BIRCH: An Efficient Data Clustering . . . Databases," Int'l Proc of the ACM SIGMOD Conference, Montreal, Canada, pp. 103–114, 1996.

A White Paper Prepared by MciroStrategy, Inc., "The Case for Relational OLAP," 20 pages, 1995.

* cited by examiner

ANALYSIS OF RETAIL TRANSACTIONS USING GAUSSIAN MIXTURE MODELS IN A DATA MINING SYSTEM

CROSS REFERENCE TO RELATED APPLICATIONS

This application is related to the following co-pending and commonly assigned patent applications:

Application Ser. No. 09/739,993, filed on same date herewith, by Paul M. Cereghini and Scott W. Cunningham, and entitled "ARCHITECTURE FOR A DISTRIBUTED RELATIONAL DATA MINING SYSTEM,"

Application Ser. No. 09/740,119, filed on same date herewith, by Scott W. Cunningham, and entitled "IMPROVEMENTS TO GAUSSIAN MIXTURE MODELS IN A DATA MINING SYSTEM,"

Application Ser. No. 09/739,994, filed on same date herewith, by Mikael Bisgaard-Bohr and Scott W. Cunningham, and entitled "DATA MODEL FOR ANALYSIS OF RETAIL TRANSACTIONS USING GAUSSIAN MIXTURE MODELS IN A DATA MINING SYSTEM,"

all of which applications are incorporated by reference herein.

BACKGROUND OF THE INVENTION

1. Field of the Invention

This invention relates to a computer-implemented data mining system, and in particular, to a system for analyzing retail transactions using Gaussian Mixture Models in a distributed relational data mining system.

2. Description of Related Art

Many computer-implemented systems are used to analyze commercial and financial transaction data. In many instances, such data is analyzed to gain a better understanding of customer behavior by analysis of customer transactions.

Prior art methods for analyzing customer transactions often involve one or more of the following techniques:

1. Ad hoc querying: This methodology involves the iterative analysis of transaction data by human effort, using querying languages such as SQL.

2. On-line Analytical Processing (OLAP): This methodology involves the application of automated software frontends that automate the querying of relational databases storing transaction data and the production of reports therefrom.

3. Statistical packages: This methodology requires the sampling of transaction data, the extraction of the data into flat file or other proprietary formats, and the application of general purpose statistical or data mining software packages to the data.

Nonetheless, there remains a need for improved techniques for analyzing transaction data.

SUMMARY OF THE INVENTION

A computer-implemented data mining system that analyzes data using Gaussian Mixture Models. The data is accessed from a database, and then an Expectation-Maximization (EM) algorithm is performed in the computer-implemented data mining system to create the Gaussian Mixture Model for the accessed data. The EM algorithm generates an output that describes clustering in the data by computing a mixture of probability distributions fitted to the accessed data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention represents a way of producing customer segments from a transactional database. A segment is a grouping of data elements organized about one or more attributes. These customer segments may serve as the basis for merchandising or marketing campaigns. They are a powerful basis for analysis of customer behavior, and they are useful means for summarizing the often exhaustive contents of transaction-based data warehouses.

Hardware and Software Environment

Figure 1:
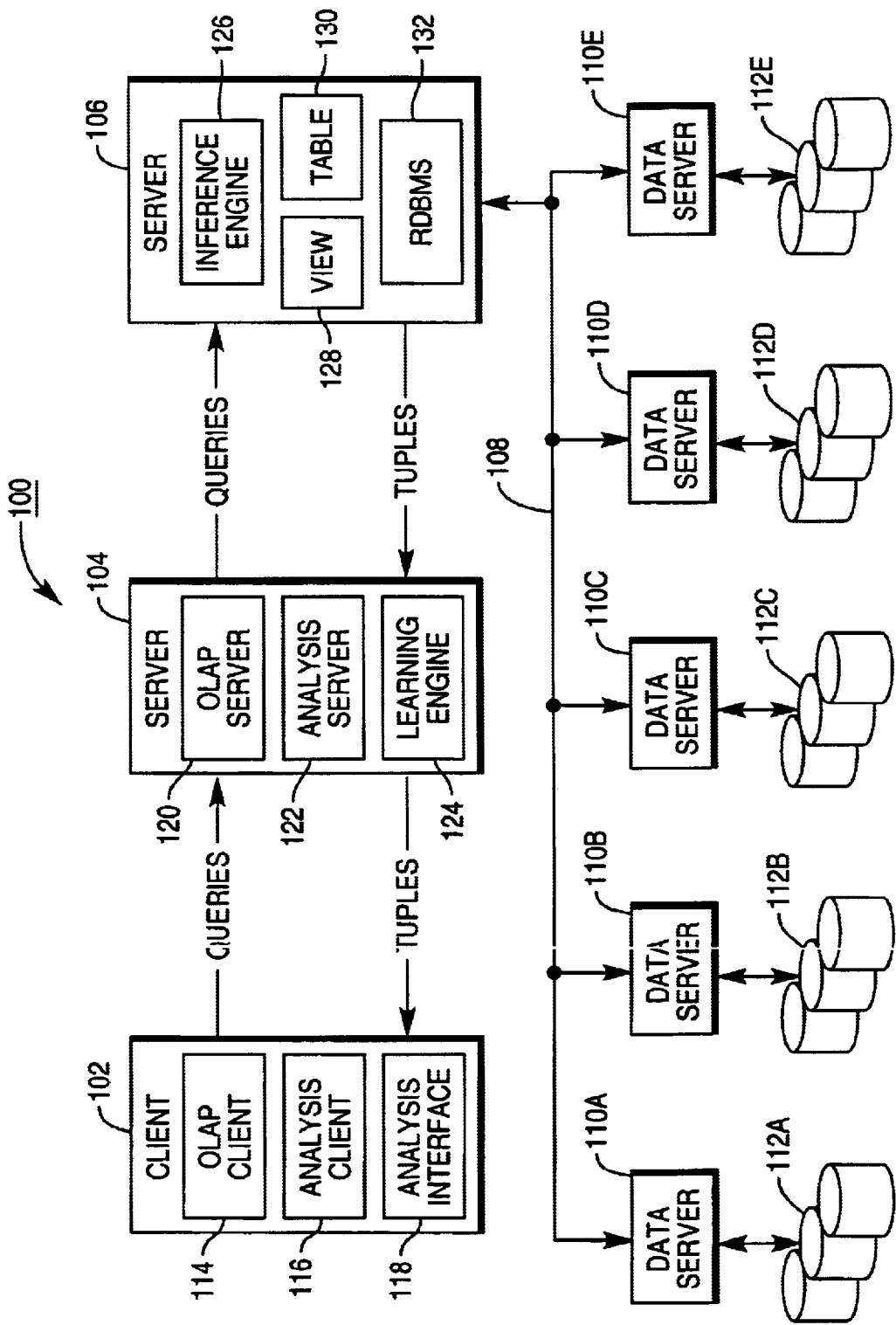
FIG. 1 illustrates an exemplary hardware and software environment that could be used with the present invention.

FIG. 1 illustrates an exemplary hardware and software environment that could be used with the present invention. In the exemplary environment, a computer system 100 implements a data mining system in a three-tier client-server architecture comprised of a first client tier 102, a second server tier 104, and a third server tier 106. In the preferred embodiment, the third server tier 106 is coupled via a network 108 to one or more data servers 110A–110E storing a relational database on one or more data storage devices 112A–112E.

The client tier 102 comprises an Interface Tier for supporting interaction with users, wherein the Interface Tier includes an On-Line Analytic Processing (OLAP) Client 114 that provides a user interface for generating SQL statements that retrieve data from a database, an Analysis Client 116 that displays results from a data mining algorithm, and an Analysis Interface 118 for interfacing between the client tier 102 and server tier 104.

The server tier 104 comprises an Analysis Tier for performing one or more data mining algorithms, wherein the Analysis Tier includes an OLAP Server 120 that schedules and prioritizes the SQL statements received from the OLAP Client 114, an Analysis Server 122 that schedules and invokes the data mining algorithm to analyze the data retrieved from the database, and a Learning Engine 124 performs a Learning step of the data mining algorithm. In the preferred embodiment, the data mining algorithm comprises an Expectation-Maximization procedure that creates a Gaussian Mixture Model using the results returned from the queries.

The server tier 106 comprises a Database Tier for storing and managing the databases, wherein the Database Tier includes an Inference Engine 126 that performs an Inference step of the data mining algorithm, a relational database management system (RDBMS) 132 that performs the SQL statements against a Data Mining View 128 to retrieve the data from the database, and a Model Results Table 130 that stores the results of the data mining algorithm.

The RDBMS 132 interfaces to the data servers 110A–110E as mechanism for storing and accessing large relational databases. The preferred embodiment comprises the Teradata® RDBMS, sold by NCR Corporation, the assignee of the present invention, which excels at high volume forms of analysis. Moreover, the RDBMS 132 and the data servers 110A–110E may use any number of different parallelism mechanisms, such as hash partitioning, range partitioning, value partitioning, or other partitioning methods. In addition, the data servers 110 perform operations against the relational database in a parallel manner as well.

Generally, the data servers 110A-110E, OLAP Client 114, Analysis Client 116, Analysis Interface 118, OLAP Server 120, Analysis Server 122, Learning Engine 124, Inference Engine 126, Data Mining View 128, Model Results Table 130, and/or RDBMS 132 each comprise logic and/or data tangibly embodied in and/or accessible from a device, media, carrier, or signal, such as RAM, ROM, one or more of the data storage devices 112A–112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

For example, the 3-tier architecture of the preferred embodiment could be implemented on 1, 2, 3 or more independent machines. The present invention is not restricted to the hardware environment shown in FIG. 1.

Operation of the Data Mining System

The present invention allows analysts to gain a better understanding of customer behavior by means of a thorough cluster analysis of customer transactions, although customer identification is not required for the analysis. The goal of cluster analysis is to group items coherently according to perceived similarities in the data.

Gaussian Mixture Models are the particular form of clustering that is used in the analysis performed by the present invention. The data for the clustering consists of customer transactions or "baskets." The baskets are grouped according to behavioral similarities revealed during shopping. The resulting transaction clusters offer an insight into the shopping behavior of both individuals and groups. Marketing professionals call these clusters "customer segments."

When applied to basket data, clustering provides three broad opportunities for analysis and business improvement. Of primary importance in all these analyses is the economic impact of the customer segment.

1. Price and Promotion Analysis: How responsive are various segments to the pricing and promotion of products? What product attributes are most appealing to each segment? Which segments are brand loyal or prefer store brands?

2. Demographic and Locational Analysis: What are the demographic characteristics of customer segments? How do store formats and locations affect the mix of customer segments? How is the mix of customer segments changing over time?

3. Purpose and Interest Analysis: What was the apparent purpose of the visit? What departments were visited? How much variety in shopping was displayed by customer segment? How frequently did the customer shop? Which items satisfy particular shopping needs?

Demographic data is useful since it allows knowledge about particular customers to be extended to representative customer segments. This is used, for example, in the demographic typing of customer segments. It is also used in establishing shopping frequency statistics by customer segment.

Affinity is a form of analysis that examines the frequency with which various products are purchased both together and separately. Segmentation reveals the very different patterns of purchases and affinities that are possible across distinct customer groups. Segmentation therefore is a powerful extension to standard affinity analysis.

There are many ways of grouping transactions to analyze customer behavior. In addition, many forms of customer analysis deal with summary data about customers as a whole. The advantages of using Gaussian Mixture Models, a statistical form of analysis, are four-fold:

1. Automation: Gaussian Mixture Models are automated statistical procedures suitable for finding patterns and clusters in databases. As a result, machine techniques can be applied to the searching and scanning of databases, thereby relieving human analysts of the task.

2. Statistical Quality: Gaussian Mixture Models find robust and repeatable patterns in the database. In addition, there is an intrinsic measure of model quality, known as the "log-likelihood." This allows users to interpret the quality of the results and to explicitly examine shortcomings of the solutions.

3. Summarization: Gaussian Mixture Models provide effective summarization of exhaustive databases of customer transactions. The resulting summary allows analysts to deal with the most representative transactions in the database.

4. Disaggregation: By separating sources of variability in the transaction database, analysts gain a better understanding of how customer behavior varies. Armed with this knowledge, retailers may act upon distinct customer groups to encourage profitable behavior.

There are two components to the present invention: a data model which defines a structure for storing customer transactional information within the data mining system 100 and an algorithm performed by the data mining system 100 to analyze the transactional information into coherent groups according to perceived similarities in the transactional data. The data model provides a minimum specification for the transactional data needed in the analysis. The algorithm performs the mapping function necessary to aggregate the transactional data for cluster analysis. The result, as noted, is a grouping of the transactional data into segments, wherein each segment may be summarized by a set of prototypical behaviors.

The preferred embodiment of the present invention provides a number of advantages.

First, the present invention is entirely automated, requiring few arbitrary decisions or expectations regarding the solution or structure on the part of the analyst, which differs substantially from "ad hoc querying" used in prior efforts.

Second, the present invention employs "fuzzy sets" that result in high fidelity reproduction and summarization of database results, which differs substantially from prior efforts, such as OLAP systems that utilize SQL sets as a means of defining customer segments.

Third, the present invention uses a single, dedicated algorithm with a well-defined data model. As a result, the present invention requires very little specialized knowledge to utilize and interpret the results. This represents a significant difference from prior designs utilizing statistical packages.

Data Model

Figure 2:
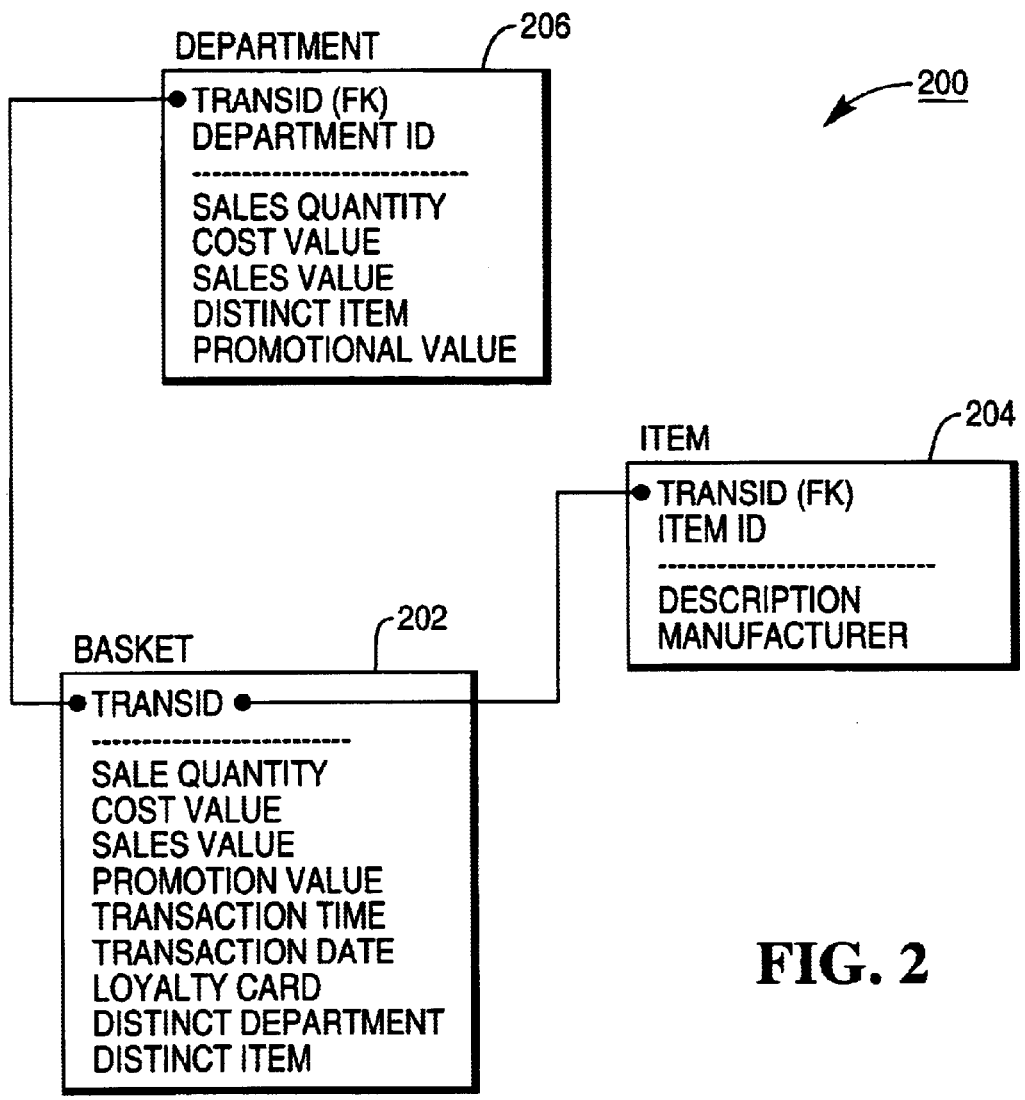
FIG. 2 is a diagram that illustrates the structure of a data model according the preferred embodiment of the present invention.

FIG. 2 is a diagram that illustrates the structure of a data model 200 according the preferred embodiment of the present invention. The data model 200 The data model 200 defines the structure for storing transactional data in the relational database managed by the RDBMS 132. This transactional data might be obtained, for example, from a point-of-sale device.

In the preferred embodiment, three tables are used in the model 200: a basket table 202, an item table 204 and a department table 206. The basket data 202 contains summary information about transactions. The item table 204 contains information about individual items purchased by customers. The department table 206 is a source of useful aggregate information about transaction sales by store department (although this data may ultimately be derived entirely from the item table 204).

This data is then mapped into a single flat table format, perhaps using a database view, to produce the correct level of aggregation for the statistical analysis. The analysis requires one row to one customer transaction. Multiple transactions by the same customer are not of concern. In general, customers can not be uniquely identified from this format or view.

Algorithm

Figure 3:
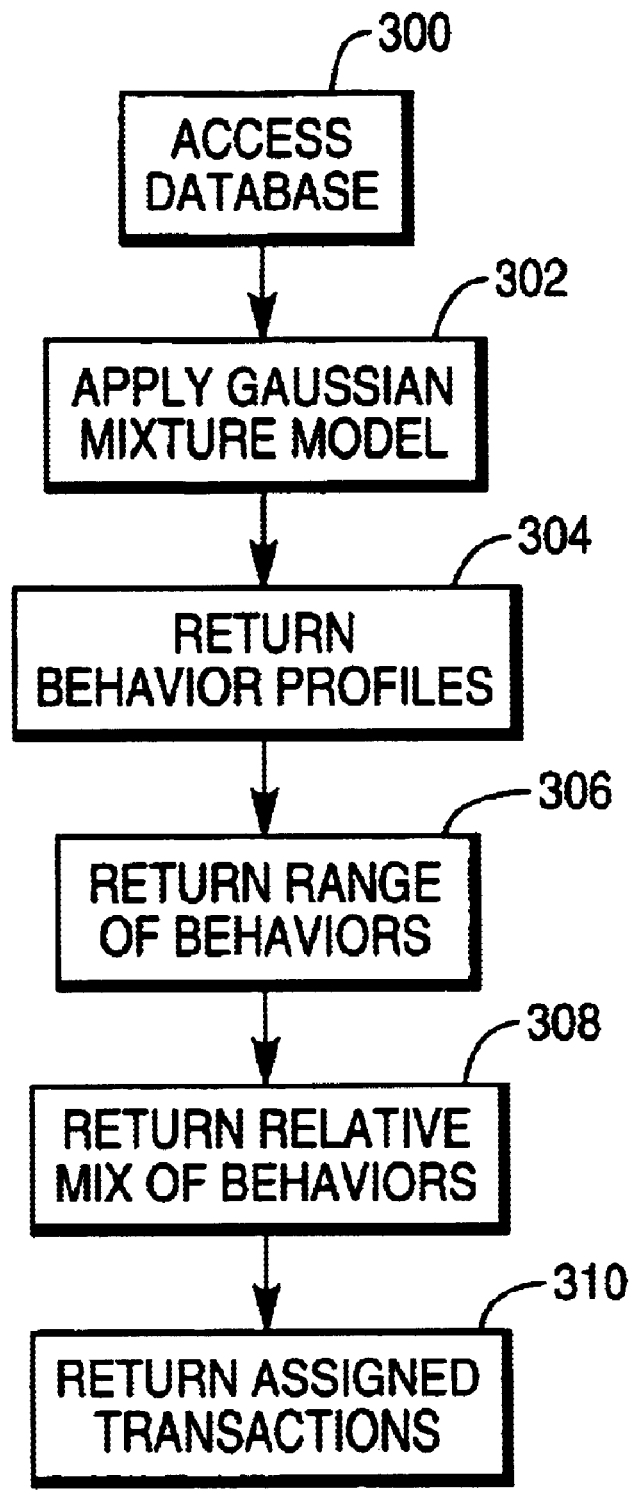
FIG. 3 is a flowchart that illustrates the logic for crating and using the data model 200 according the preferred embodiment of the present invention.

FIG. 3 is a flowchart that illustrates the logic for creating and using the data model 200 according the preferred embodiment of the present invention.

Block 300 represents the transactional data being accessed and retrieved from the relational database by the RDBMS 132.

Block 302 represents a Gaussian Mixture Model algorithm being applied to the transactional data by the Analysis Server 122, the Learning Engine 124, and the Inference Engine 126 to create the data model 200. The Gaussian Mixture Model assumes that the transactions result from a mix of distinct customer behaviors.

Gaussian Mixture Models are a form of machine learning, described in more detail in sources such as Roweis, S. T. and Ghahramani, Z. (1999), A Unifying Review of Linear Gaussian Models, Neural Computation 11(2):305–345, which publication is incorporated by reference herein. One implementation of an algorithm for generating the Gaussian Mixture Models is described in co-pending and commonly-assigned application Ser. No. 09/740,119, filed on same date herewith, by Scott W. Cunningham, and entitled "IMPROVEMENTS TO GAUSSIAN MIXTURE MODELS IN A DATA MINING SYSTEM," which application is incorporated by reference herein.

Block 304 represents behavioral "profiles" reported across a range of selected variables being returned from the data model 200 maintained by the Analysis Server 122 to the Analysis Client 116.

Block 306 represents a range of behaviors expected from each variable, in each cluster, being returned from the data model 200 maintained by the Analysis Server 122 to the Analysis Client 116.

Block 308 represents the relative mix or proportions of behaviors in the database being returned from the data model 200 maintained by the Analysis Server 122 to the Analysis Client 116.

Block 310 represents an assignment of analyzed transactions to associated customer behaviors being returned from the data model 200 maintained by the Analysis Server 122 to the Analysis Client 116. The default results show the mixes of behaviors represented within any given transaction. Alternatively, the results can be formatted so that one transaction has one, and only one, associated behavior. (This "winner-takes-all" approach is helpful for reporting results in a relational database setting).

Generally, the results of applying a Gaussian Mixture Model to a transactional database results in a set of behaviors that are easily interpretable. The resulting clusters are understood as "segments" by marketing or merchandising decision-makers. Each set of segment behaviors may be named by the user, and might form the basis for instance, of a promotional campaign. The model may also be maintained so that future transactions can be assigned a "score" according to the representative behavior involved. This allows the maintenance of databases for "intervention" analysis. An example of such a behavioral analysis might be: "Did the resulting promotional campaign increase the profitability of a given customer segment?"

CONCLUSION

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses a computer-implemented data mining system that analyzes data using Gaussian Mixture Models. The data is accessed from a database, and then an Expectation-Maximization (EM) algorithm is performed in the computer-implemented data mining system to create the Gaussian Mixture Model for the accessed data. The EM algorithm generates an output that describes clustering in the data by computing a mixture of probability distributions fitted to the accessed data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for analyzing data in a computer-implemented data mining system, comprising:

establishing a database for storing and organizing transactional data, said transactional data being organized within said database in accordance with a data model, said data model comprising a basket table that contains summary information about transactions, an item table that contains information about individual items purchased by customers, and a department table that contains aggregate information about transaction sales by store department; and mapping the transactional data contained in said database to aggregate the transactional data for cluster analysis.

2. The method of claim 1, further comprising the step of:

analyzing the transactional data using cluster analysis into coherent groups according to perceived similarities in the transactional data.

3. The method of claim 2, wherein said analyzing step utilizes a Gaussian Mixture Model.

4. The method of claim 1, wherein said mapping step aggregates the transactional data into a single flat table view, and each row within said table view includes information concerning a single customer transaction.

5. The method of claim 4, further comprising the step of:

analyzing the transactional data using cluster analysis into coherent groups according to perceived similarities in the transactional data.

6. The method of claim 5, wherein said analyzing step utilizes a Gaussian Mixture Model.

7. A computer-implemented data mining system for analyzing data, comprising:

a computerized database for storing and organizing transactional data, said transactional data being organized within said database in accordance with a data model, said data model comprising a basket table that contains summary information about transactions, an item table that contains information about individual items purchased by customers, and a department table that contains aggregate information about transaction sales by store department; and means for mapping the transactional data contained in said database to aggregate the transactional data for cluster analysis.

8. The system of claim 7, further comprising:

a cluster analysis program for grouping the transactional data into coherent groups according to perceived similarities in the transactional data.

9. The system of claim 8, wherein said cluster analysis program utilizes a Gaussian Mixture Model.

10. The system of claim 7, wherein said means for mapping aggregates the transactional data into a single flat table view, wherein each row within said table view includes information concerning a single customer transaction.

11. The system of claim 10, further comprising:

a cluster analysis program for grouping the transactional data into coherent groups according to perceived similarities in the transactional data.

12. The system of claim 11, wherein said cluster analysis program utilizes a Gaussian Mixture Model.

* * * * *

UNITED STATES PATENT AND TRADEMARK OFFICE
CERTIFICATE OF CORRECTION

PATENT NO. : 6,947,878 B2  Page 1 of 1
DATED : September 20, 2005
INVENTOR(S) : Bisgaard-Bohr, M. and Cunningham, S.

It is certified that error appears in the above-identified patent and that said Letters Patent is hereby corrected as shown below:

<u>Title page,</u>
Item [75], Inventors, "Mikael Bisgaard-Bhr" should read -- Mikael Bisgaard-Bohr --.

Signed and Sealed this

Ninth Day of May, 2006

JON W. DUDAS
*Director of the United States Patent and Trademark Office*